United States Patent [19]

Weldon et al.

[11] Patent Number: 4,935,708
[45] Date of Patent: Jun. 19, 1990

[54] HIGH ENERGY PULSE FORMING GENERATOR

[75] Inventors: William F. Weldon; Mircea D. Driga; Siddharth B. Pratap, all of Austin, Tex.

[73] Assignee: Board of Regents, The University of Texas Systems, Austin, Tex.

[21] Appl. No.: 30,890

[22] Filed: Mar. 25, 1987

[51] Int. Cl.$^5$ ............................................. H02P 9/14
[52] U.S. Cl. .................................... 322/62; 310/111; 123/3
[58] Field of Search ............... 310/111, 198, 266, 184, 310/208, 180, 207, 168, 10.206, 254, 261, 308; 322/8, 47, 62, 48, 100, 63, 64, 67; 315/39 R, 71, 111.41, 289; 124/3

[56] References Cited

U.S. PATENT DOCUMENTS

| | | | |
|---|---|---|---|
| 2,432,117 | 12/1942 | Morton | 310/111 |
| 3,500,078 | 3/1970 | Buser | 290/1 R |
| 3,564,307 | 2/1971 | Kawabe et al. | 310/10 |
| 4,146,001 | 3/1979 | McCarthy | 310/111 |
| 4,200,831 | 4/1980 | Weldon et al. | 322/8 |
| 4,263,525 | 4/1981 | Lathlaen | 310/111 |
| 4,266,180 | 5/1981 | Juvan | 322/8 |

FOREIGN PATENT DOCUMENTS

| | | |
|---|---|---|
| 1052514 | 3/1951 | Fed. Rep. of Germany ...... 310/111 |
| 122453 | 9/1927 | Switzerland . |
| 811429 | 2/1982 | U.S.S.R. . |
| 4907 | 9/1910 | United Kingdom . |

OTHER PUBLICATIONS

"Pulsed Power from Inertial Storage with Homopolar Machines for Conversion", Proceedings, IEEE Int'l Pulsed Power Conference, by Woodson et al., 11/9-11/76.
"Future Trends for Compulsators Driving Railguns", S. B. Pratap, et al., 4/20-24/86.

Primary Examiner—R. Skudy
Attorney, Agent, or Firm—Arnold, White & Durkee

[57] ABSTRACT

A machine is disclosed having the ability to generate high energy pulses of electrical power with a high degree of flexibility in the shape of the pulse. Different mechanism provide non-uniform or non-symmetrical magnetic flux density distributions through which an armature winding is rotated. The electromotive force induced in the armature winding has a waveform which may be customized by use of the different mechanisms or by a combination of the techniques. Additionally, a non-symmetrical armature winding or a compensation winding may be used to tailor the output pulse to achieve the desired characteristics.

16 Claims, 6 Drawing Sheets

Fig. 6A (ARMATURE WINDING 2 CONDUCTORS/POLE)

Fig. 6B (COMPENSATING WINDING 8 CONDUCTORS/POLE)

HIGH ENERGY PULSE FORMING GENERATOR

FIELD OF THE INVENTION

The present invention pertains to the generation of pulses of electrical energy and, more particularly, to a device and method for producing short duration, high energy pulses of electrical power and for providing a high degree of flexibility in the shape of the pulse.

BACKGROUND OF THE INVENTION

Pulsed power supplies represent a technology with applications in the areas of national defense, fusion, space technology, and in industry. Depending upon the application, different types of current and voltage pulse shapes are required to be delivered by the pulsed power supplies. For example, an electromagnetic launcher requires a generally rectangular pulse of high current. The level of energy delivered to such a launcher will generally be in the tens of megajoules. With the relatively recent developments in electromagnetic launchers and high energy lasers have come new requirements for high levels of electric energy to be delivered in particular wave shapes.

Until recently, pulsed power has been supplied using capacitors and other electrical energy storage devices. However, overall dissatisfaction with the high cost and low energy storage capabilities of these devices has led to a search for more suitable supplies.

A result of that search for more suitable pulsed power supplies is shown in U.S. Pat. No. 4,200,831 to Weldon et al. A compensated pulsed alternator generates a short duration, high energy pulse of electrical power by using a compensating winding to reduce the internal impedance of the alternator at the moment of its peak output. The result is to increase the output current of the alternator. One limitation of the compensated pulsed alternator, however, is that it has limited flexibility in the nature of the generated current and voltage pulse shape.

SUMMARY OF THE INVENTION

The present invention accomplishes the result of the compensated pulsed alternator with the additional feature that high energy pulses of electrical power may be generated with a high degree of flexibility in the nature of the pulse. The device, which includes a single phase, two or multi-pole alternator with inertial energy storage, can be used to directly power devices such as electromagnetic launchers wherein a generally rectangular, flat current pulse is desired. Alternatively, the device can generate electrical pulses of virtually any shape, depending on the specific application and desired shape. For example, an output current pulse of constantly increasing or decreasing value may be required or a generally rectangular pulse with a large dip may be desirable for a given load. The present invention will enable the generation of such pulses.

The method according to the present invention for producing high energy pulses of electrical power generally includes two steps. First, a magnetic flux distribution is established in the generator using excitation field windings and armature windings. Second, that magnetic flux is "compressed" or modified in selected areas, creating a customized magnetic flux pattern which will induce an electromotive force (EMF) in the armature winding. The output current produced as a result of the induced EMF will have characteristics determined by the custom flux pattern.

A pulse-forming generator according to the present invention generally comprises a flux pattern mechanism for producing a magnetic flux having a non-uniform or non-symmetrical pattern, an armature winding rotatable through that magnetic flux to generate an output electrical pulse waveform having a predetermined shape, with the shape of the pulse being dependent upon the non-uniform pattern of magnetic flux. The non-uniform flux pattern may be established by the use of harmonically distributed excitation field windings, the use of excitation field windings having non-uniform configurations or relative positioning, or a combination of the two. Active or passive compensation may also be included to further shape and customize the magnetic flux pattern. The use of a compensation coil to actively enhance the flux distribution or the use of a shield having selected conductive areas and selected non-conductive areas to passively enhance the flux distribution each have the effect of "compressing" the magnetic flux in selected areas. Alternatively or additionally, the armature winding may be non-uniform or non-symmetrical, resulting in unequal magnetic flux linkage of different coils, causing an alteration in the induced EMF and resulting in a change in the output current pulse.

Although the use of many of the techniques requires that they be built into the machine during its design and manufacture, certain features which may be included may be alternately used or not used, providing dynamic customizing of the magnetic flux pattern and, thus, the output pulse. For example, selected excitation coils may be supplied from various power sources and a change in the source will effect a change in the magnetic flux pattern.

DESCRIPTION OF THE INVENTION

U.S. Pat. No. 4,200,831 to Weldon et al. describes a compensated pulse alternator having a rotating armature within a set of stationary field coils with a conducting shell surrounding the armature. A stationary or counter-rotating compensating coil may be used to increase the output voltage of the alternator and to reduce the internal impedance of the alternator at the moment of peak output. The entire disclosure of that patent is incorporated herein by reference. The present invention is believed to be a patentable advance over the invention disclosed in that patent.

Also, attached hereto as Appendix A, is an article written by S.B. Pratap, M.D. Driga, W.F. Weldon and M.L. Spann, entitled "Future Trends for Compulsators Driving Railguns". The entire disclosure of that article is incorporated herein by reference.

Basically, a generator or alternator has two principal components. A field, or excitation, winding is a coil or group of coils through which an electrical current is passed. This "excitation" current sets up a magnetic field in the vicinity of the coil and the magnetic field includes what are commonly referred to as "lines of magnetic flux". An armature winding is a coil, separate from the excitation coil, which cuts through the lines of magnetic flux created by the field winding and excitation current. This cutting action results in an induced electromotive force (EMF), or voltage, on the armature winding according to well-established principles of electromagnetic theory. When an electrical load is connected to the armature winding, an electrical current will be made to flow because of the induced EMF. Thus an output voltage and current are generated by the generator. The principles of operation of generators and alternators are well-known to those of skill in the art.

Figure 10:
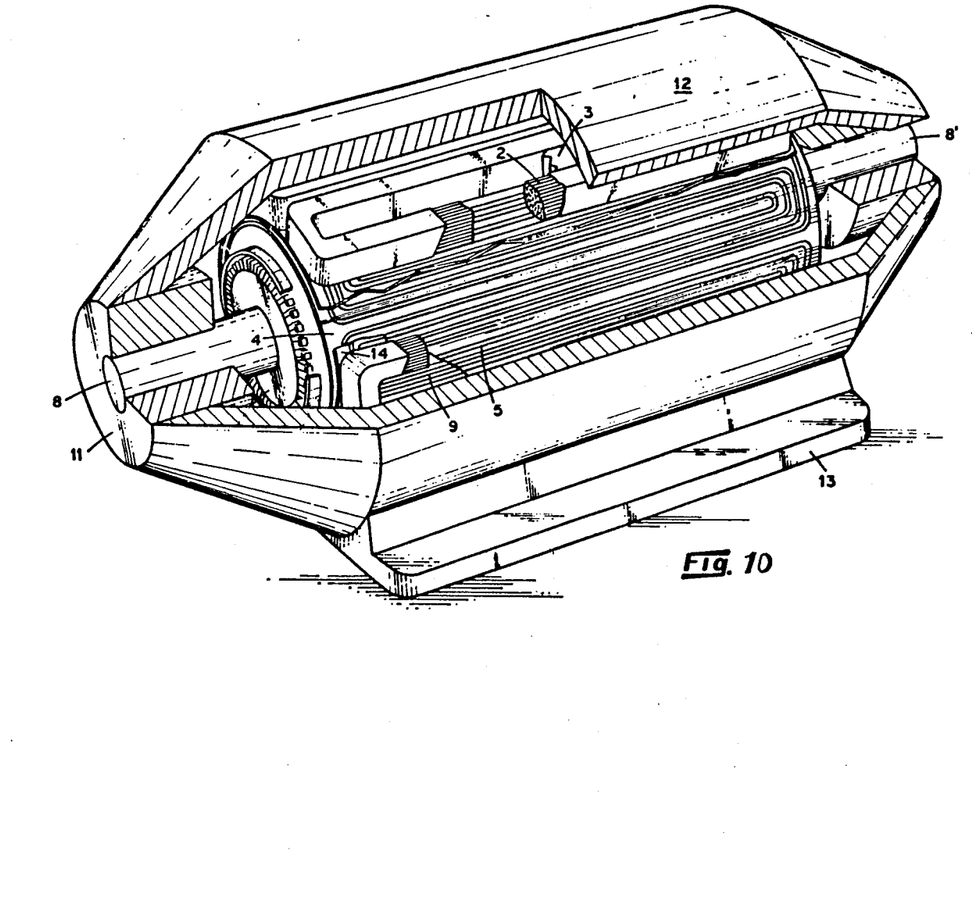
FIG. 10 is an isometric, cut-away view of a prior art generator having a compensating coil adapted to be stationary or counter-rotated with respect to the rotor coil.

FIG. 10 illustrates an alternator having a multiple-pole configuration, as described in U.S. Pat. No. 4,200,831. A base member 13 supports a backiron member 12. Mounted within the member 12 are a pair of bearings 11 which support a drive shaft 8. Coupled to the shaft 8 is a non-magnetic, non-conductive rotor 4 upon which is mounted an armature coil 5. A cylindrical conductive shield 14 is mounted in spaced relation to the rotatable rotor 4 and a compensating coil 9 is mounted on the shield 14. The shield 14 may be stationary, or it can be counter-rotated with respect to the rotor 4. In the latter case, the shield is mounted to a suitable end plate, not shown, and rotated by a shaft 8'. A plurality of stationary field windings 2 and respective associated pole-pieces 3 are mounted to the inside wall of the backiron member 12 and are in spaced relation to the shield 14.

The present invention involves the creation of custom magnetic flux patterns in a pulse generator using specially configured field coils and some form of active or passive compensation. Additionally or alternatively, non-uniform or non-symmetrical armature windings may be used to tailor the shape of the output voltage or current. The present invention enables the production of short duration, high energy pulses of electrical power with a high degree of flexibility in the shape of the current pulse. The pulse shape may be controlled by an alteration, or customizing, of the magnetic flux distribution created by the excitation field windings and through which the armature windings are rotated. The magnetic flux distribution may be customized by different methods which will be described below or by a combination of the various methods.

One application of the present invention relates to a pulse-forming generator for supplying large amounts of electrical energy in a short-duration, rectangular pulse to an electromagnetic launcher. A fast rise time and flat pulse are highly desirable in such an application. The various alternatives which may be used to generate that waveform will be discussed and a preferred embodiment will be described.

In generating the rectangular, flat current pulse or any other desired waveform according to the present invention, generally two steps are included. First, a basic magnetic flux distribution is created using the field coils. Second, the magnetic flux is "compressed" or altered in selected areas relative to non-selected areas, resulting in an alteration in the basic distribution and a further customizing of the flux distribution.

The preferred method for generating the rectangular, flat pulse utilizes harmonic windings in the field to create a ramp flux distribution. A non-uniformly distributed conductive shield is interposed between the field and the armature to compress the magnetic flux in selected areas relative to selected other areas.

Figure 2A:
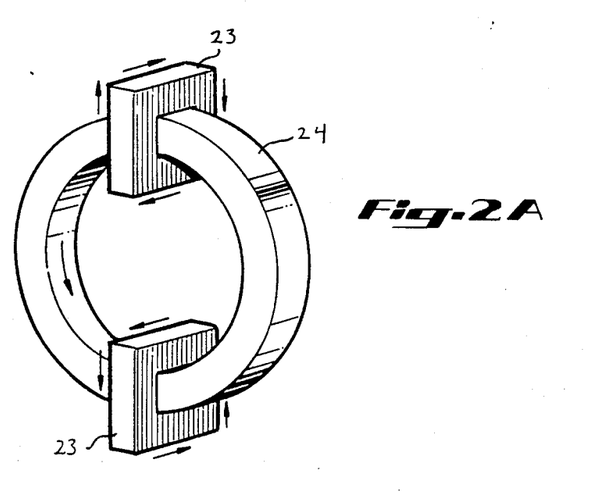
FIG. 2A shows a Gramme ring having only two excitation coils.
Figure 2B:
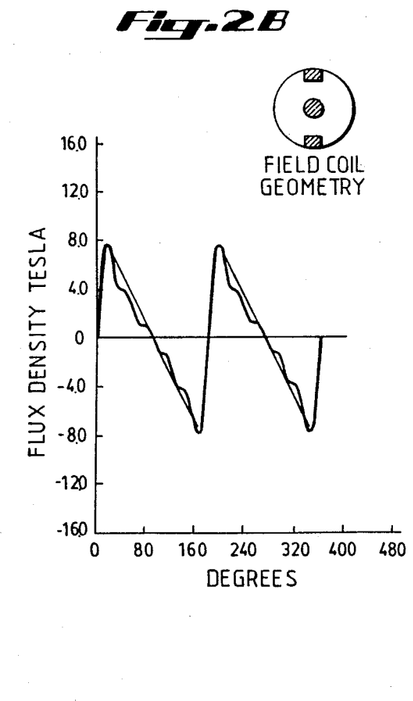
FIG. 2B and 2C show the flux density distribution and the generated voltage in the armature for the configuration of FIG. 2A.
Figure 2C:
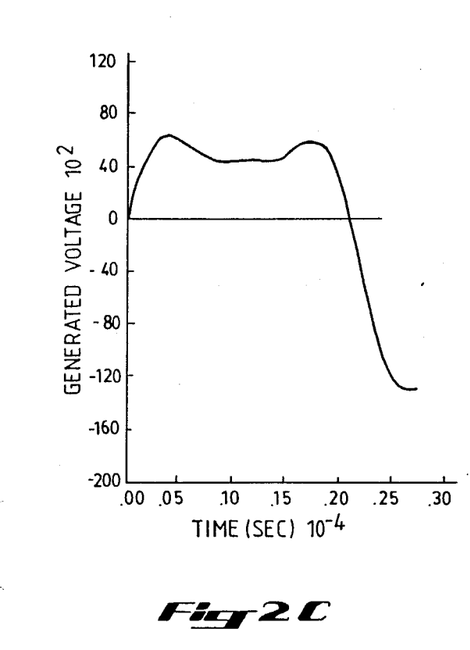

FIG. 2A shows a Gramme ring 24 having two field coils 23 wound thereon. With the excitation current flowing in the direction indicated by the arrows, a magnetic flux density distribution is established as shown in FIG. 2B. An armature winding (not shown in the drawing) rotated through the flux density represented by FIG. 2B will have a generated voltage as shown in FIG. 2C. It can be seen from FIGS. 2B and 2C that the use of a primary or fundamental excitation winding alone will generate a voltage pulse with significant variation in its magnitude.

Figure 1A:
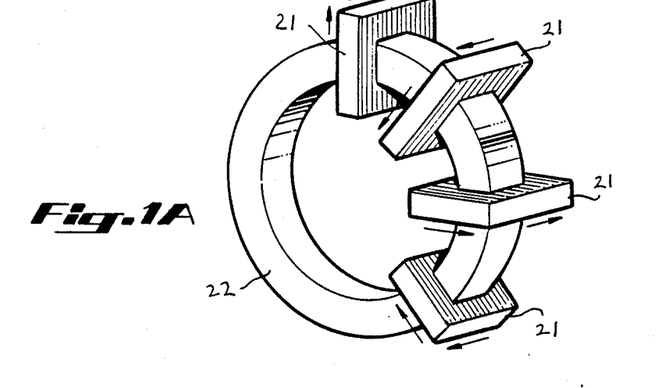
FIG. 1A shows a Gramme ring having excitation coils.
Figure 1B:
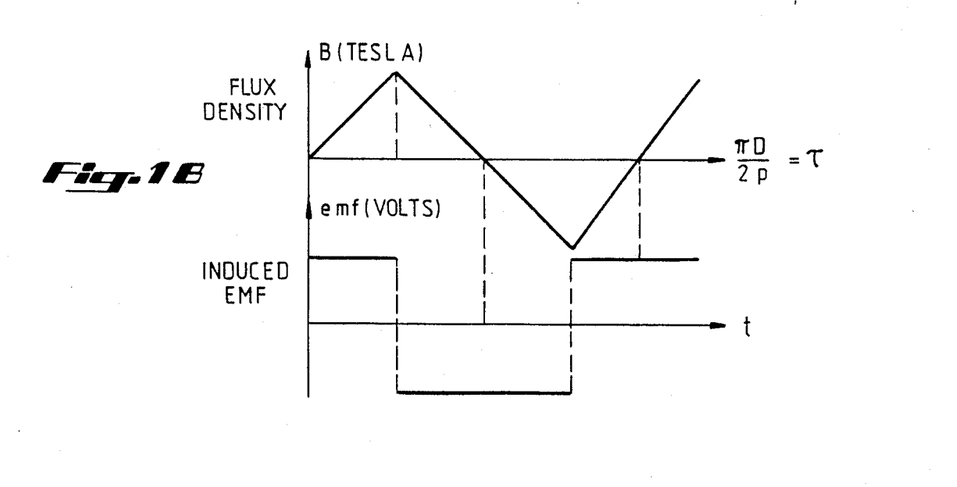
FIG. 1B shows waveforms for the magnetic flux density and armature induced EMF resulting from the coils of FIG. 1A.

FIG. 1A shows a Gramme ring 22 on which several field coils 21 located. In adjacent coils, the currents flow in opposite directions, as shown by the arrows, producing a flux pattern directed alternatively inward and outward through the intervals between the coils, thus improving the linkage between the excitation and the armature. FIG. 1B illustrates the waveforms for the flux density B and for the induced EMF in the armature resulting from the excitation coils of FIG. 1A.

For the rectangular flat current pulse, the second and fourth harmonics are predominant in the desired excitation flux distribution. These two harmonics are present in the flux distribution of FIG. 2B and are generated by half-pitch and quarter-pitch windings in conjunction with the fundamental, or full-pitch, windings. A half-pitch winding is one which spans a polar angle one-half the angle spanned by the fundamental winding. Likewise, a quarter-pitch winding is one which spans a polar angle one-quarter the angle spanned by the fundamental winding. So, for example, if the fundamental winding spans 180°, then the half-pitch winding will span 90° while the quarter-pitch winding will span 45°. This is better illustrated by considering an iron cored machine.

Figure 3A:
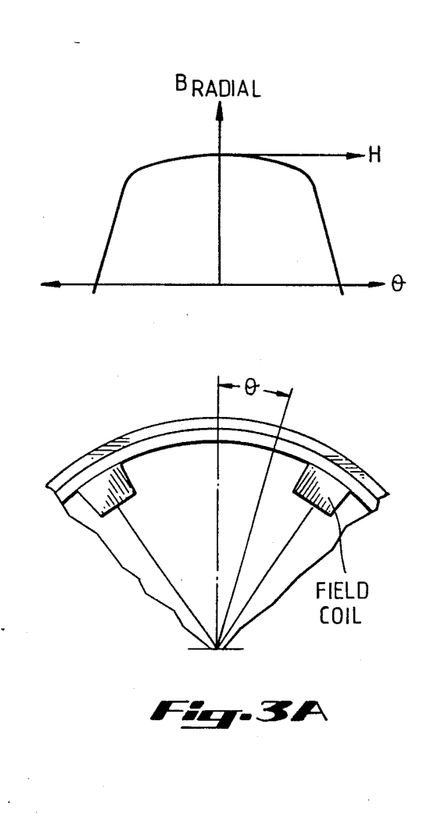
FIG. 3A illustrates a lumped field winding and the radial flux density distribution for the lumped field winding.
Figure 3B:
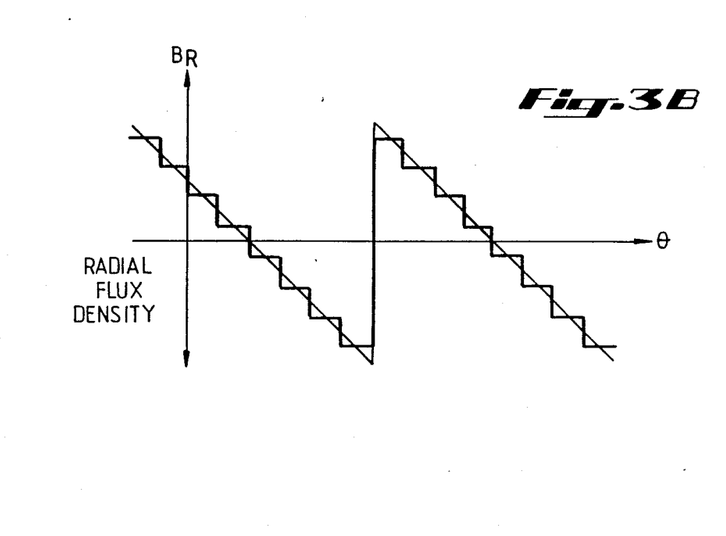
FIG. 3B shows the flux density distribution resulting from the combination of a full-pitch, full-amplitude winding, a half-pitch, half-amplitude winding and a quarter-pitch, quarter-amplitude winding.
Figure 3C:
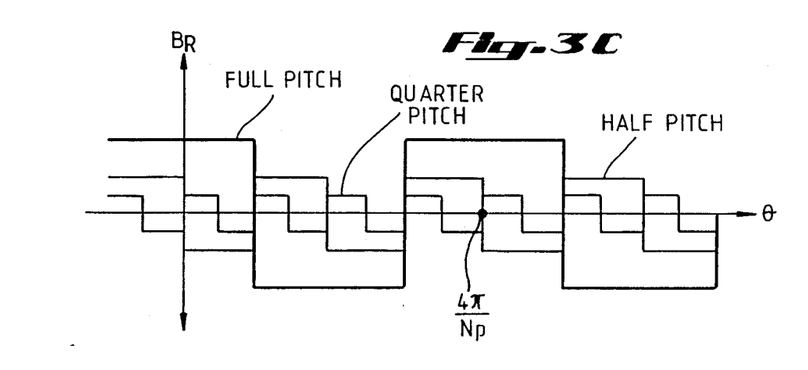
FIG. 3C shows the component flux density contributions of each of the windings of FIG. 3B.

For a salient pole or a lumped field winding, illustrated in FIG. 3A, the radial flux density distribution is as shown in FIG. 3A. This distribution is the same for all the poles of the machine. This lumped field winding is called the full-pitch, full amplitude winding and is the fundamental winding. If in addition to this winding, a half-pitch, half amplitude and a quarter-pitch, quarter amplitude winding are provided, then the resulting radial flux density distribution is as shown in FIG. 3B. FIG. 3C illustrates the component flux density distribution provided by the full-, half- and quarter-pitch windings each. Thus the half-pitch, half amplitude and quarter-pitch, quarter amplitude windings have the effect of altering the radial flux density distribution resulting from the field windings and, accordingly, the induced EMF in the armature which is rotated through the resulting magnetic flux.

Of course, the amplitude of the excitation current in the half-pitch and quarter-pitch windings may vary and need not be one-half and one-quarter the amplitude of the current in the full-pitch winding. The amplitudes of the current in each of the windings may be independent of one another with a corresponding independence of the magnitudes of the components of the flux density distribution. The resulting flux distribution will be altered accordingly.

The half-pitch and quarter-pitch windings may be located at positions corresponding to the full-pitch windings or they may be offset at any desired angle and with any desired spacing. Those parameters as well as the polar angle between the full-, half- and quarter-pitch windings will be determined by the output pulse characteristics which are desired. Also, variation in the number of full-, half- and quarter-pitch windings will result in different magnetic flux patterns and the number of each type of winding may differ from the number of each other type. For the flat current pulse, the half-pitch and quarter-pitch windings are preferably located at positions corresponding to the full-pitch windings and at equally spaced intervals therebetween. This preferred embodiment will be more fully described below.

Further, although the various field windings may be designed and built into a particular machine, their use may be selectively controlled to provide additional customizing of the magnetic flux density and, therefore, the output current pulse shape.

After the basic magnetic flux pattern has been created, for example, by selective configuration of the various field windings, an armature winding may be rotated through it to generate a voltage in the armature winding. However, if a load is connected to the armature and an electrical current begins to flow, losses will occur due to the impedance of the armature. One contributor to that impedance is the magnetic field which is generated in the vicinity of the armature due to the flow of current through the armature winding. A result of the losses is a drop in the output voltage and corresponding drop in the output current. Active or passive compensation can be employed to counteract the losses in the armature due to the magnetic field generated by the current flow.

Figure 4:
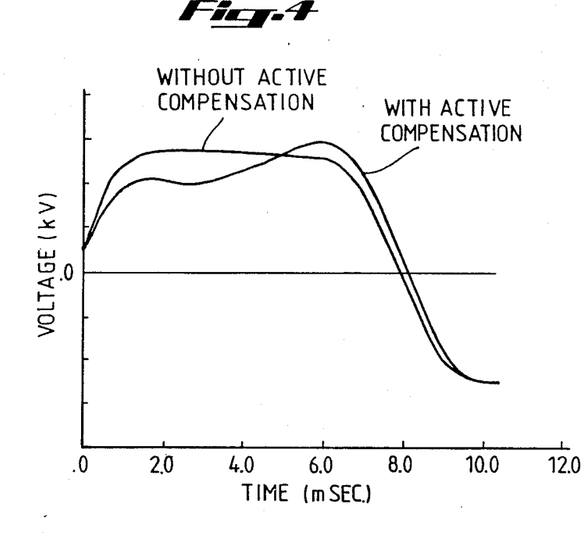
FIG. 4 shows the effect on generated voltage of the addition of a compensation winding to the armature.

FIG. 4 illustrates that active compensation using an additional winding connected in series with the armature as a compensation winding can achieve the desired voltage and current pulse shapes. Active compensation simply means that an electrical current is passed through the compensation winding to actively generate a magnetic field which will compensate for that set up by the armature current.

U.S. Pat. No. 4,200,831 to Weldon, et al. shows a compensation winding used to counteract the magnetic field established by the current flow in the armature winding, effectively lowering the impedance of the armature near the end of the output pulse. The typical compensation winding for such an application is identical to the armature winding with respect to configuration. Compensation achieves compression of the magnetic flux. However, a variation between the armature winding and the compensation winding can result in over-compensation or under-compensation and can achieve selective compression of the magnetic flux in the generator. Magnetic flux compression results when two parallel conductors carrying current in opposite directions are forced to approach one another. The respective magnetic fields tend to repel one another and the lines of flux become compressed. The compensation winding 9 will be located between the field winding 2 and the armature coil 5 and will cause compression of the magnetic flux between the field winding 2 and the armature coil 5.

The flux compression pattern which ultimately determines the pulse shape can be controlled by varying the polar pitch, phase shift distribution and turn density for the compensation winding 9. That is, a greater polar pitch on the winding produces a more gradual effect on the induced EMF in the armature coil 5 and a lesser pitch causes a more abrupt change in the EMF as the armature passes the field compensation winding 9. Further, use of the compensation winding may be selectively controlled, providing greater dynamic control of the output pulse waveform.

The curves for the generated voltage in the armature in the presence of a passively compensating shield are shown in FIG. 2C and FIG. 4. With a non-uniform shield, such as shield 17 illustrated in FIG. 7, an almost custom tailored pulse shape can be obtained. The non-uniform construction refers to the fact that the shield is made of high conductivity portion F alternating with low conductivity parts or even holes C and D, which may be filled with insulation. The magnetic flux is trapped and compressed in the high conductivity portion of the shield and the armature winding portion covered by that part of the shield has a low internal impedance. The flux develops freely in the non-conductive part of the shield and the portion of the armature winding covered by that non-conductive part of the shield has a high internal impedance. The shield preferably will be stationary with respect to the field coils and will be rotating with respect to the armature. Therefore, the conductive portions of the shield will be rotating to cover constantly changing portions of the armature. The change in time of the combination of low and high internal impedance allows the production of any desired pulse shape for the voltage and for the current of the machine. A shield configuration which can be used to generate the rectangular flat current pulse will be more fully described below.

Since one design variant for the shield is a squirrel cage structure, the non-uniform shield version of compensation can be achieved by a non-uniform pitch between different longitudinal bars of the squirrel cage, or a combination of high conductivity and low conductivity bars.

The configuration of the armature windings themselves will have an effect on the trapping and compressing of magnetic flux, alone or in conjunction with excitation windings, shielding and compensation windings. For example, a symmetrical excitation field may be generated in a traditional manner and a non-symmetrical armature winding may be rotated through that field. The configuration of the armature winding will determine the wave shape of the output voltage current.

Figure 5:
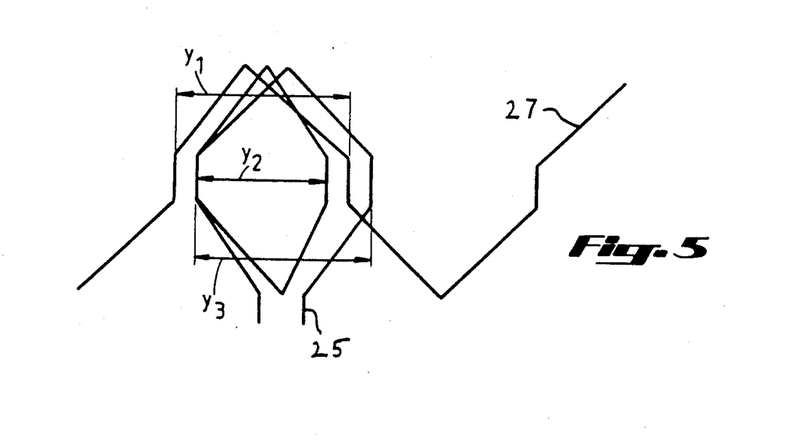
FIG. 5 illustrates an armature winding which is a combination of wave and lap coils having different coil pitches.
Figure 6A:
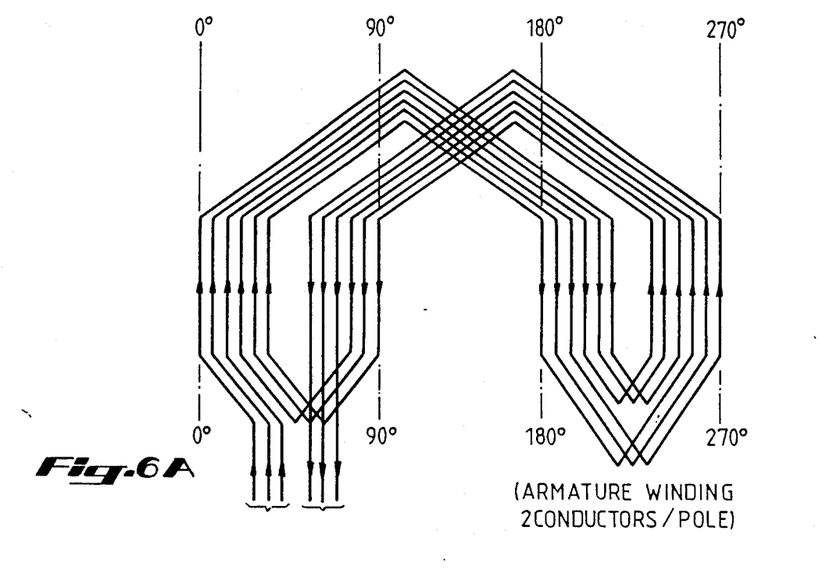
FIGS. 6A and 6B show, respectively, an armature winding for a current flat pulse machine and the corresponding compensating winding.
Figure 6B:
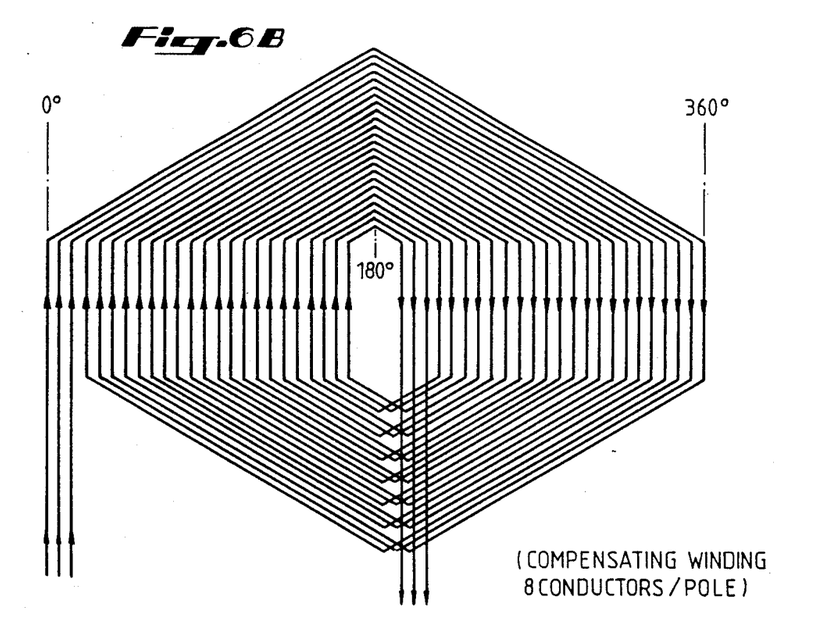

The armature windings may be a combination of wave winding coils 27 and lap winding coils 25 having different coil pitches y1, y2, y3 as illustrated in FIG. 5. The non-symmetrical structure of the windings provides further means to shape the voltage and the current pulse, due primarily to the unequal magnetic flux linkage of different coils. As an example, a simple version of armature winding for a flat current pulse machine is represented in FIG. 6A. FIG. 6B shows the corresponding compensating winding.

The various methods discussed above for generating a custom magnetic flux pattern may be used alone or in combinations. When used in combination, the angles between the excitation coils, armature coils, compensation coils and shield, and their combinations, will be determined according to the duration, shape and amplitude of the desired pulse.

Because a pulse generating machine according to the present invention is an electromechanical converter with inertial energy storage, it will slow down during high energy pulses, thus modifying the shape of the pulse. The methods described above can be used to compensate for the slowing down effects or they may be used to accentuate them, depending upon the desired pulse characteristics.

A machine according to the present invention can be topologically built with the excitation either on the outer or on the inner part. Further, either the outer part or the inner part can be rotating. Still another possible configuration will have both the excitation and armature rotating. The machine may also be built in a disk or a drum configuration.

DESCRIPTION OF THE PREFERRED EMBODIMENT

Figure 7:
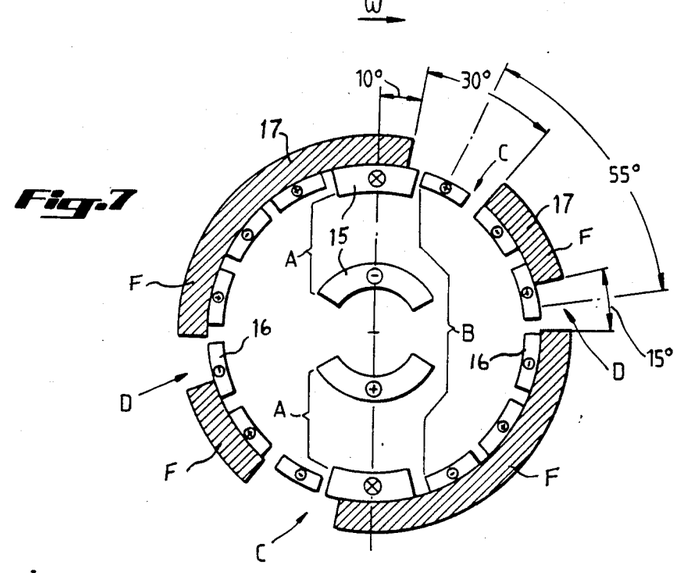
FIG. 7 is a cross-section through the rotor of a preferred embodiment of the present invention showing fundamental and harmonically distributed field windings and a non-uniformly distributed shield.
Figure 9:
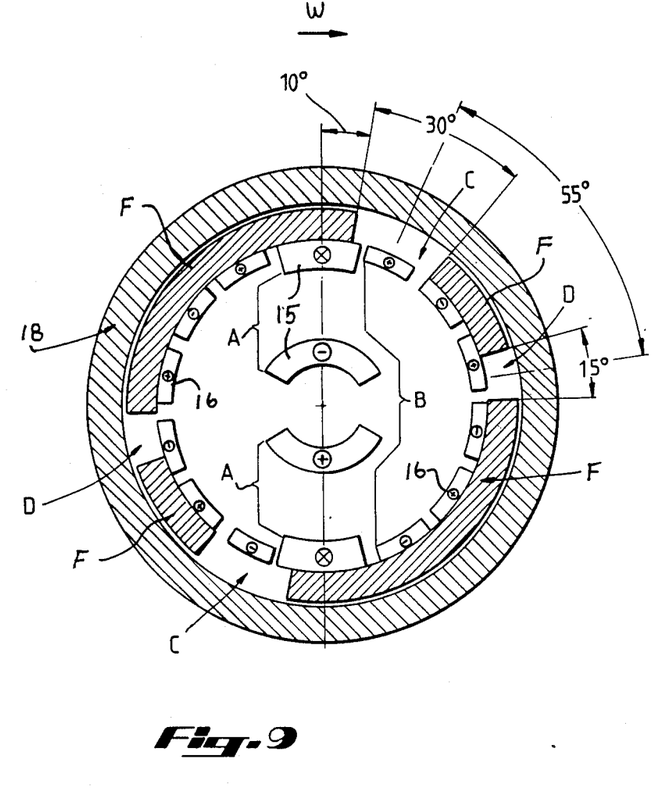
FIG. 9 is the cross-section of FIG. 7 including a stator.

The preferred embodiment of the high energy pulse forming generator is a passively compensated electrical machine, the compensation deriving from a non-uniformly distributed shield on the rotor that produces a non-symmetric flux pattern. The excitation is provided by different field windings arranged to produce second and fourth harmonics in the magnetic field and in the EMF induced in the armature winding. The generator will store 77 megajoules (MJ) of kinetic energy and will discharge in 4.6 milliseconds (ms), delivering a current of 5.45 mega-amps (MA) to a railgun (not shown in the drawings) in an almost rectangular pulse. The railgun is designed to accelerate a 12 kilogram (kg) mass to a velocity of 2 kilometers/second (km/s) at a constant acceleration of $5.8 \times 10^5$ meters/second$^2$ (m/s$^2$)—due to the constancy of the current. The cross-section through the rotor of the generator, shown in FIG. 7, shows the relative disposition of the system A and B excitation windings 15 and 16, respectively, as well as the shield 17. Although not shown in FIG. 7, the armature winding may reside on a stator 18 which surrounds the rotor as shown in FIG. 9.

The system A excitation coils 15 are configured as a Gramme ring (see FIG. 2A) and provide the majority of the required excitation ampere-turns. The space distribution of the magnetic flux is as shown in FIG. 2B and an armature voltage of shape shown in FIG. 2C is generated. The system A excitation coils 15 are lumped winding, or concentrated winding, coils. That is, the polar angle subtended by the coil is very small as the coil conductors are "stacked up" on one another rather than "spread out" as in a distributed winding. The pitch of the system A coils of FIG. 7—the distance from one pole to the next —is 180° and they represent the full-pitch, or fundamental, windings.

The system B excitation coils 16 provide additional magnetomotive force (with strong second and fourth harmonics) in order to increase the induced voltage in the armature in the initial period of the pulse, to achieve a high rate of rise of current in the load, and to compensate, at later moments in the pulse, for the voltage drop and back electromotive force in the railgun. The system B coils 16 are distributed windings and the polar angle between the windings is such as to produce second and fourth harmonics in the excitation magnetic flux pattern in relation to the fundamental windings. The direction of excitation current flow in the system B coils 16 alternates from one "leg" to the next, setting up flux lines in opposite directions. The spacing between the coil windings and the direction of current flow are the primary determinants of the harmonic created, as was discussed above. The system B coils 16 produce about 18% of the magnetomotive force of the system A coils 15.

The magnetic flux density distribution resulting from the superposition of the system A and system B coils of FIG. 7 is triangular in shape and is as shown in FIG. 1B. The EMF induced in the armature winding (see FIG. 9) rotated through such a flux distribution will have the shape shown in FIG. 1B. But as discussed above, the connection of a load to the armature will cause an electric current to flow in the armature winding and losses will occur which will distort the output voltage and current waveforms.

To assure a higher regularity of the rectangular pulse, an aluminum shield 17 surrounds the field coils 15 and 16 and is fixed relative to those coils. Two pairs of longitudinal slots C and D) are cut into the 1.5-cm thick, aluminum shield 17. Each slot in the first pair is 30° wide and its center is displaced about 25° from the center of a system A excitation coil 15. Each slot in the second pair spans an arc of about 15° and its center is displaced about 55° from the center of a slot in the first pair. This non-uniformly distributed shield 17 compresses the magnetic flux in the vicinity of its conductive areas F and allows the flux to develop freely in its non-conductive areas C and D. The magnetic flux density distribution is then "dynamically" altered in a predictable manner as the field coils 15 and 16 and shield 17 are rotated on the rotor.

The armature winding (not shown) is on the stator 18, as shown in FIG. 9, and is a regular full pitch, lap winding. The stator additionally carries a three-phase winding which is used for self-excitation of the generator. The excitation windings may be, however, separately excited from one or several power supplies.

Figure 8:
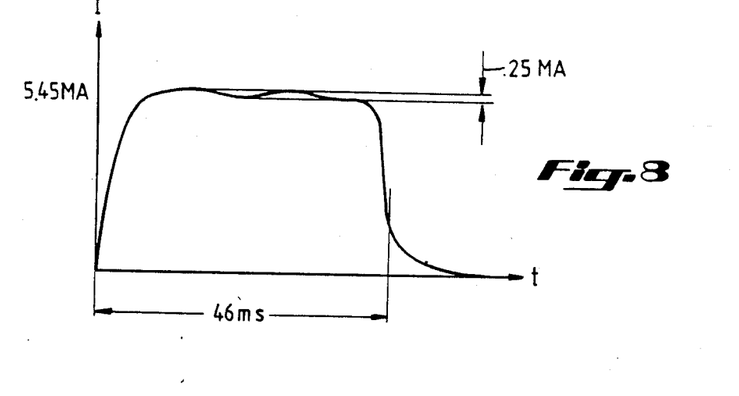
FIG. 8 shows the output current waveform generated by a preferred embodiment.

The output current pulse shape is shown in FIG. 8. The current provided to the railgun is $5.45 \times 10^6$ A (FIG. 2), for a duration of $4.6 \times 10^{-3}$ sec, with a steep rise and sudden decay. The variation in the amplitude, or ripple, of the current during the launch is less than five percent. If slots C and D in the shield are made wider or if they are put closer together or further apart, the output current pulse shape will display more ripple than the shape shown in FIG. 8. The "dip" in the center of the wave shape will be greater and the "bump" will be displaced. The result will be a greater variation at the top of the output shape, although that result may be desirable, depending upon the application.

It will be appreciated that variations in the embodiment described may be developed without departing from the present invention as defined in the appended claims.

What is claimed is:

1. A pulse-forming generator for producing current and voltage pulses, comprising:
   an excitation field winding for producing a magnetic flux;
   a compensation means for compressing the magnetic flux in selected areas relative to selected other areas to form an asymmetric flux pattern;
   an armature winding rotatable through the asymmetric flux pattern to generate an output electrical pulse having a predetermined shape;
   the pulse shape being dependent upon the asymmetric flux pattern.

2. The generator of claim 1, wherein said excitation field winding comprises:
   a fundamental excitation field winding and a plurality of harmonically distributed field windings for producing fundamental and harmonic magnetic flux components in response to the flow of excitation current therethrough, each of the plurality of harmonically distributed field windings having a polar pitch.

3. The generator of claim 2, wherein the amplitude of the excitation current in each harmonically distributed winding is independent of the amplitude of the excitation current in each other of the plurality of harmonically distributed windings and is independent of the amplitude of the excitation current in the fundamental excitation field winding.

4. The generator of claim 2, wherein the polar pitch of each harmonically distributed winding is independent of the polar pitch of each other of the plurality of harmonically distributed windings.

5. The generator of claim 1, wherein the compensation means comprises:
   a non-uniform shield adjacent the armature winding and adjacent the field winding and having selected conductive areas and selected non-conductive areas, the shield adapted to change the distribution in space of the magnetic flux in the selected conductive areas relative to the magnetic flux in the selected non-conductive areas.

6. The generator of claim 5, wherein the shield is positioned between the armature winding and the excitation field winding.

7. The generator of claim 6, wherein the non-conductive areas comprise longitudinal slots aligned along the excitation field winding.

8. The generator of claim 5, wherein the output electrical pulse has a shape selectively predetermined by the configuration of the conductive areas and non-conductive areas of the shield.

9. The generator of claim 1, further comprising:
   a plurality of excitation field windings have non-uniform spacing therebetween, each field winding operative to produce a magnetic flux component in response to an excitation current passing therethrough, each magnetic flux component contributing to the asymmetric flux pattern through which the armature winding is rotated.

10. The generator of claim 1, wherein the compensation means includes a compensation winding whose configuration differs from the configuration of the armature winding and which operates in conjunction with the armature winding to alter the shape of the output pulse.

11. The generator of claim 1, wherein the armature winding is non-symmetrical and wherein the pulse shape further depends on the configuration of the armature winding.

12. The generator of claim 11, wherein the armature winding includes wave and lap winding coils having non-uniform pitches.

13. A pulse-forming generator, comprising:
    an excitation field winding for producing a magnetic flux in response to an electrical current passing therethrough;
    a non-uniform shield configured to change the distribution in space of the magnetic flux in selected areas relative to selected other areas;
    an armature winding for rotation through the magnetic flux to generate an output electrical pulse waveform; and
    a compensation winding to cooperate with the armature winding to further alter the distribution of the magnetic flux and to increase the amplitude of the output electrical pulse waveform.

14. A generator, having a rotor and a stator, for producing an output current having a substantially rectangular waveform, comprising:
    a full pitch, lap winding armature on the stator;
    a plurality of primary and harmonic excitation coils, the primary excitation coils arranged as a Gramme ring to produce primary excitation and the harmonic excitation coils arranged to produce harmonic excitation; and
    a generally cylindrical non-uniformly distributed conductive shield on the rotor, the shield having first and second pairs of longitudinal slots therein, each slot of the first pair spanning an arc of about 30° with centers displaced about 25° from a primary excitation coil, and each slot of the second pair spanning an arc of about 15° with centers displaced about 55° from the centers of the first pair.

15. The generator of claim 14, wherein the harmonic excitation includes second and fourth harmonic excitation.

16. A method for producing current and voltage pulses, comprising the steps of:
    establishing a magnetic flux pattern having fundamental and harmonic components;
    compressing the pattern in selected areas relative to selected other areas to form an asymmetric flux pattern;
    passing an electrical winding through the asymmetric flux pattern to generate a pulse having a shape determined by the asymmetric flux pattern.

* * * * *